United States Patent Office 3,079,302
Patented Feb. 26, 1963

3,079,302
O-[N-DI-(CHLOROALKYL)CARBAMOYL] SERINE
Franz Bergel and Roy Wade, London, England, assignors to National Research Development Corporation, London, England, a British corporation
No Drawing. Filed Feb. 17, 1959, Ser. No. 793,760
Claims priority, application Great Britain Feb. 21, 1958
10 Claims. (Cl. 167—78)

This invention relates to novel anti-tumour agents and to processes for their preparation.

The novel compounds of the present invention are of the general formula:

and acid addition salts thereof, where R is hydrogen or an alkyl group containing not more than three carbon atoms, $R_1$ is a hydrogen atom or a lower alkyl radical and Z is a chlorine or bromine atom.

It will be understood that the compounds of the present invention may occur in optically active forms and the present invention includes not only the DL form but also the D and L forms.

The terms "lower alkyl" and "lower acyl" as used herein refer to radicals containing not more than five carbon atoms.

Preferred compounds are O-[N-di-(2-chloroethyl)carbamoyl]-serine (particularly the L form), O-[N-di-(2-chloroethyl)carbamoyl]-serine methyl ester, and O-[N-di-(2-chloropropyl)carbamoyl]-serine.

Experiments carried out on Wistar rats have shown that DL O-[N-di-(2-chloroethyl)carbamoyl]-serine is non-toxic at a dosage rate of 250 mgm. in water or 1000 mgm. in oil. The substance is effective against the Walker tumour in rats as is shown by the data in the following Table I:

TABLE I

| Dose per day per rat for ten days | Ratio of weight of control (untreated) tumour to weight of treated tumour in test animals |
|---|---|
| 10 mgm | 1.6 (i.e. tumour inactive). |
| 25 mgm | 22.5. |
| 100 mgm | Total inhibition. |

The L form was even more effective.

The DL form was also tested on the very resistant benzpyrene and "August" tumours in rats and caused some holdup of their growth rates, but the methyl ester hydrochloride showed a greater effect on the latter tumour, but no effect on the transplated mammary tumour in C— male mice.

O-[N-(di-2-chloropropyl)carbamoyl]-serine was also tested against the Walker tumour in rats and was found to be effective, as shown in the following Table II:

TABLE II

| Dose (single) per rat | Ratio of weight of control (untreated) tumour to weight of treated tumour in test animals |
|---|---|
| 300 mgm | Total inhibition. |
| 250 mgm | 31.3. |

The present invention also includes a process for the preparation of compounds of the general Formula I which comprises reacting a compound of the general formula:

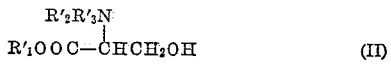

with phosgene and a compound of the general formula $(ZCHRCH_2)_2NH$ where $R'_1$ is a lower alkyl radical or aralkyl radical, $R'_2$ is a lower acyl or alkoxylcarbonyl radical and $R'_3$ is hydrogen or $R'_2$ and $R'_3$ together form a phthaloyl group, R has the meaning given above and Z is a chlorine or bromine atom, to give a compound of the general formula:

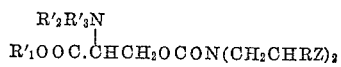

and then by hydrolysis or hydrogenolysis converting it into a compound of the general formula:

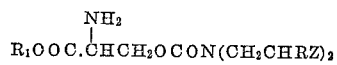

A specific embodiment of the process of the invention may be expressed by the reaction scheme:

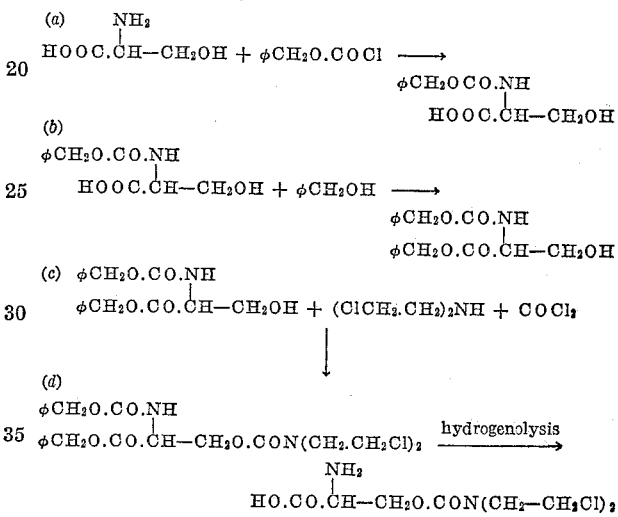

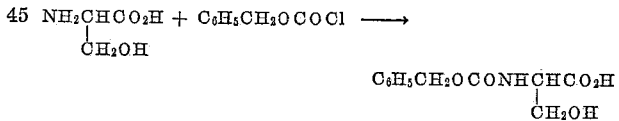

where $\phi$ means a phenyl radical.

The following examples illustrate the process of the invention:

Example 1

(a) CARBOBENZOXY-DL-SERINE

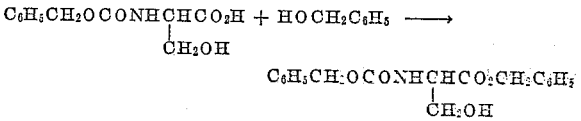

The first stage of this preparation should be carried out in the fume cupboard.

Carbobenzoxy chloride (26 ml.) was added to a well stirred solution of DL serine (12 g.) in sodium bicarbonate solution (240 ml., saturated). After three hours the excess carbobenzoxy chloride was extracted with ether (2 x 100 ml.) and the aqueous layer acidified with concentrated hydrochloric acid to pH 2. An oil was formed which solidified on scratching. The crystalline material was filtered off, washed with water and sucked dry. A further small quantity of product was obtained by extracting the aqueous filtrate with ethyl acetate (3 x 100 ml.), drying the combined organic layers over sodium sulphate and evaporating off the solvent. Recrystallisation was effected from ethyl acetate/petroleum ether (60/80° C.), M.P. 122–4° C. Yield 25 gm.

(b) CARBOBENZOXY-DL-SERINE BENZYL ESTER $C_6H_5CH_2OCONHCHCO_2H + HOCH_2C_6H_5 \longrightarrow$
$\qquad\qquad\qquad |$
$\qquad\qquad\qquad CH_2OH$ $\qquad\qquad\qquad C_6H_5CH_2OCONHCHCO_2CH_2C_6H_5$
$\qquad\qquad\qquad\qquad\qquad\qquad |$
$\qquad\qquad\qquad\qquad\qquad\qquad CH_2OH$ A mixture of carbobenzoxy-DL-serine (20 g.), benzyl alcohol (20 g.) and p-toluenesulphonic acid (0.5 g.) in benzene (200 ml.) was boiled under reflux using a Dean and Stark head until no further evolution of water occurred (8–15 hours). After cooling the solution was washed with saturated sodium bicarbonate solution (50 ml.) and with water, and dried over sodium sulphate. The benzene was evaporated off on the water pump and the excess benzyl alcohol on the oil pump using a maximum bath temperature of 100° C. Trituration under petroleum ether caused crystallisation. The solid was filtered off and recrystallised from ether/petroleum ether, M.P. 73–4° C. Yield 23.5 gm.

(c) N-CARBOBENZOXY-O-[N-(DI-2-CHLOROETHYL)-CARBAMOYL]-DL-SERINE BENZYL ESTER

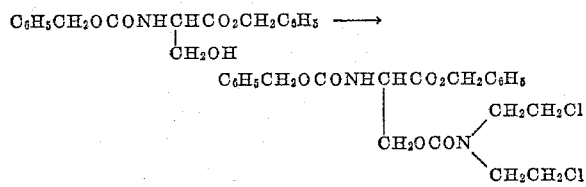

The first part of this preparation should be carried out in a good fume cupboard.

A suspension of carbobenzoxyserine benzyl ester (10 g.) in toluene (200 ml.) was stirred and cooled (0° C.) in an ice-salt bath while a stream of phosgene was passed into the liquid for 20 mins. The gas flow was then stopped, the freezing mixture removed but stirring continued while the contents of the flask attained room temperature and for a further three hours. During this time the solution became clear and slightly yellow in colour. A stream of dry nitrogen was passed through the stirred solution until no more phosgene or hydrogen chloride was evolved. The solvent was removed by evaporation under reduced pressure, care being taken to keep the bath temperature below 40° C. and the residual oil dissolved in dry benzene (20 ml.) and cooled in an ice bath.

Di-2-chloroethylamine was prepared by shaking the hydrochloride (6 g.) with ether (80 ml.) and N sodium hydroxide solution (70 ml.). The ether layer was separated, dried over sodium sulphate and evporated down to 20 ml. bulk. Triethylamine (2 ml.) was added to the solution and the whole added to the cooled benzene solution of the chloroformate prepared as described above.

After standing overnight the solution was filtered from triethylamine hydrochloride which had separated. Occasionally some product crystallised out at this point so the solid was washed with water and any insoluble solid kept on one side. The benzene/ether solution was washed with dilute acid, sodium bicarbonate solution, water and dried over sodium sulphate, the drying agent filtered off and the solvent removed under reduced pressure. Scratching the residual gum under petrol caused crystallisation, and the product was collected by filtration. Any product separated at the earlier stage was added at this point, then the crude product recrystallised from ethyl acetate/petroleum ether 60–80° C., M.P. 70–71° C. Yield 6.7 gm.

(d) O-[N-DI-(2-CHLOROETHYL)CARBAMOYL]-DL-SERINE

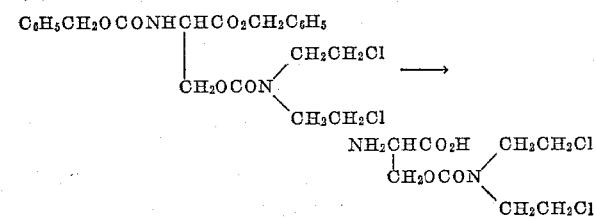

The fully protected derivative (4 g.) was hydrogenolysed in methanol (200 ml.) in a stream of hydrogen using 5% palladium on charcoal catalyst until no more carbon dioxide was detectable (with baryta) in the exit gas stream. The vessel was then transferred to the closed hydrogenator and the hydrogenolysis continued until the theoretical uptake was observed (1 mole). The catalyst was removed by filtration and the solvent by evaporation under reduced pressure using a water bath temperature <40° C. The crystalline material was recrystallised from methanol by the addition of dry ether. Yield, 1.8 gm. M.P. 140° C. (decomposed). Its analysis was: C=35.0; H=5.3%; N=10.3%; Cl=25.4%. Required for $C_8H_{14}O_4N_2Cl_2$: C=35.2%; H, 5.1%; N=10.3%; Cl, 26.0%.

*Example 2*

Example 1 was repeated but using L-serine instead of DL-serine. The O-[N-di-(2-chloroethyl)carbamoyl]-L-serine monohydrate obtained had M.P. 127° C. (decomposed); $[\alpha]_D^{22}=+6.0$ (c., 1 in water) and $[\alpha]_D^{22}=+22.0$ (c., 1 in N hydrochloric acid). Its analysis was: C=33.2%; H=5.7%; N=9.6%; Cl=24.4%. Required for $C_8H_{14}O_2N_2Cl_2:H_2O$: C=33.0%; H=5.5%; N=9.6%; Cl=24.4%.

*Example 3*

Example 1 was repeated but using DL-serine methyl ester hydrochloride instead of DL-serine. The DL-serine methyl ester hydrochloride was prepared by the method of Fischer and Suzuki (Berichte (1905), 38 4193), and had M.P. 134° C. (decomposed). The O-[N-di-(2-chloroethyl)cabamoyl]-DL-serine methyl ester was isolated in the form of its hydrochloride and had M.P. 115–116° C. (decomposed). Its analysis was: C=33.3%; H=5.1%; N=8.7%; Cl=32.7%. Required for $C_9H_{17}O_4N_2Cl_3$: C=33.4%; H=5.4%; N=8.7%; Cl=32.9%.

*Example 4*

N-CARBOBENZOXY-O-[N-(DI-2-CHLOROPROPYL)-CARBAMOYL]-DL-SERINE BENZYL ESTER

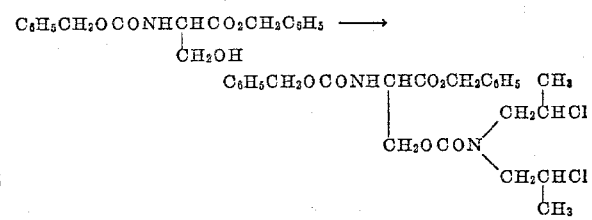

Carbobenzoxy-DL-serine benzyl ester (10 gm.) was converted to the O-chlorocarbonyl derivative by the action of phosgene as described in Example 1 and dissolved in benzene (20 ml.) as in Example 1.

Di-2-chloropropylamine was liberated from its hydrochloride (14 gm.) by the action of N sodium hydroxide solution (140 ml.) and ether (140 ml.). The ethereal solution of the base was added with stirring and cooling to the benzene solution of the chloroformate. After standing overnight the mixture was washed successively with dilute hydrochloric acid, sodium bicarbonate solution, and water, dried ($Na_2SO_4$) and the solvent removed by evaporation under reduced pressure. Trituration with petrol caused the residue to crystallise and the product was recrystallised from ethyl acetate/light petroleum. M.P. 107–8° C. Yield, 13.4 gm.

What we claim is:

1. Compounds of the general formula:

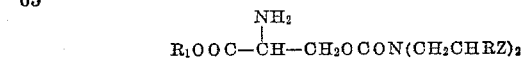

and non-toxic acid addition salts thereof, where R is selected from the group consisting of the hydrogen atom and alkyl groups containing less than four carbon atoms, $R_1$ is selected from the group consisting of the hydrogen atom and alkyl radicals containing less than six carbon atoms and Z is a halogen selected from the group consisting of chlorine and bromine.

2. O-[N-di-(2-chloroethyl)carbamoyl]-serine.

3. O-[N-di-(2-chloroethyl)carbamoyl]-L-serine.
4. O-[N-di-(2-chloroethyl)carbamoyl] - serine methyl ester.
5. O-[N-di-(2-chloropropyl)carbamoyl]-serine.
6. A process for the preparation for compounds of the general formula:

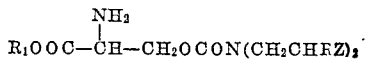

and non-toxic acid addition salts thereof, where R is selected from the group consisting of the hydrogen atom and alkyl groups containing less than four carbon atoms, $R_1$ is selected from the group consisting of the hydrogen atom and alkyl radicals containing less than six carbon atoms and Z is a halogen selected from the group consisting of chlorine and bromine, which comprises reacting a compound of the general formula:

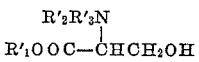

where $R'_1$ is selected from the group consisting of alkyl radicals containing less than six carbon atoms and aralkyl radicals, $R'_2$ is selected from the group consisting of acyl radicals containing less than six carbon atoms and alkoxyl-carbonyl radicals and $R'_3$ is selected from the group consisting of the hydrogen atom and a group which together with $R'_2$ forms a phthaloyl group, with phosgene and a compound of the general formula $(ZCHRCH_2)_2NH$ where R and Z have the meanings given above, to produce a compound of the general formula:

and subjecting said compound thus produced to hydrolysis to convert it into a compound of the general formula:

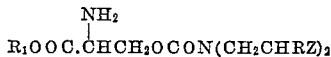

7. A process for the preparation of compounds of the general formula:

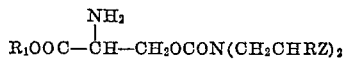

and non-toxic acid addition salts thereof, where R is selected from the group consisting of the hydrogen atom and alkyl groups containing less than four carbon atoms, $R_1$ is selected from the group consisting of the hydrogen atom and alkyl radicals containing less than six carbon atoms and Z is a halogen selected from the group consisting of chlorine and bromine, which comprises reacting a compound of the general formula:

where $R'_1$ is selected from the group consisting of alkyl radicals containing less than six carbon atoms and aralkyl radicals, $R'_2$ is selected from the group consisting of acyl radicals containing less than six carbon atoms and alkoxylcarbonyl radicals and $R'_3$ is selected from the group consisting of the hydrogen atom and a group which together with $R'_2$ forms a phthaloyl group, with phosgene and a compound of the general formula $(ZCHRCH_2)_2NH$ where R and Z have the meanings given above, to produce a compound of the general formula:

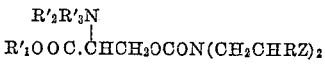

and subjecting said compound thus produced to hydrogenolysis to convert it into a compound of the general formula:

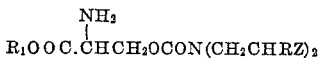

8. A pharmacological composition for treating tumors in animals, other than humans, comprising a vehicle containing per dosage unit 25 to 1,000 milligrams of O-[N-di-(2-chloroethyl)carbamoyl]-serine.
9. A composition according to claim 8, in which the vehicle is water.
10. A composition according to claim 8, in which the vehicle is oil.

References Cited in the file of this patent
UNITED STATES PATENTS
2,885,433  Hagemann et al. _____ May 5, 1959

OTHER REFERENCES
McCord et al.: J.O.C., vol. 23, pp. 1963–65 (1958).
Lyttle et al.: J.A.C.S., vol. 80 pp. 6459–60 (1958).
Evans et al.: Proc. for Exptl. Biol. and Med., pp. 620–22 (1958), 167–78C.